No. 824,176. PATENTED JUNE 26, 1906.
J. F. & N. P. DEVENNEY.
CORN PLANTER.
APPLICATION FILED SEPT. 5, 1905.
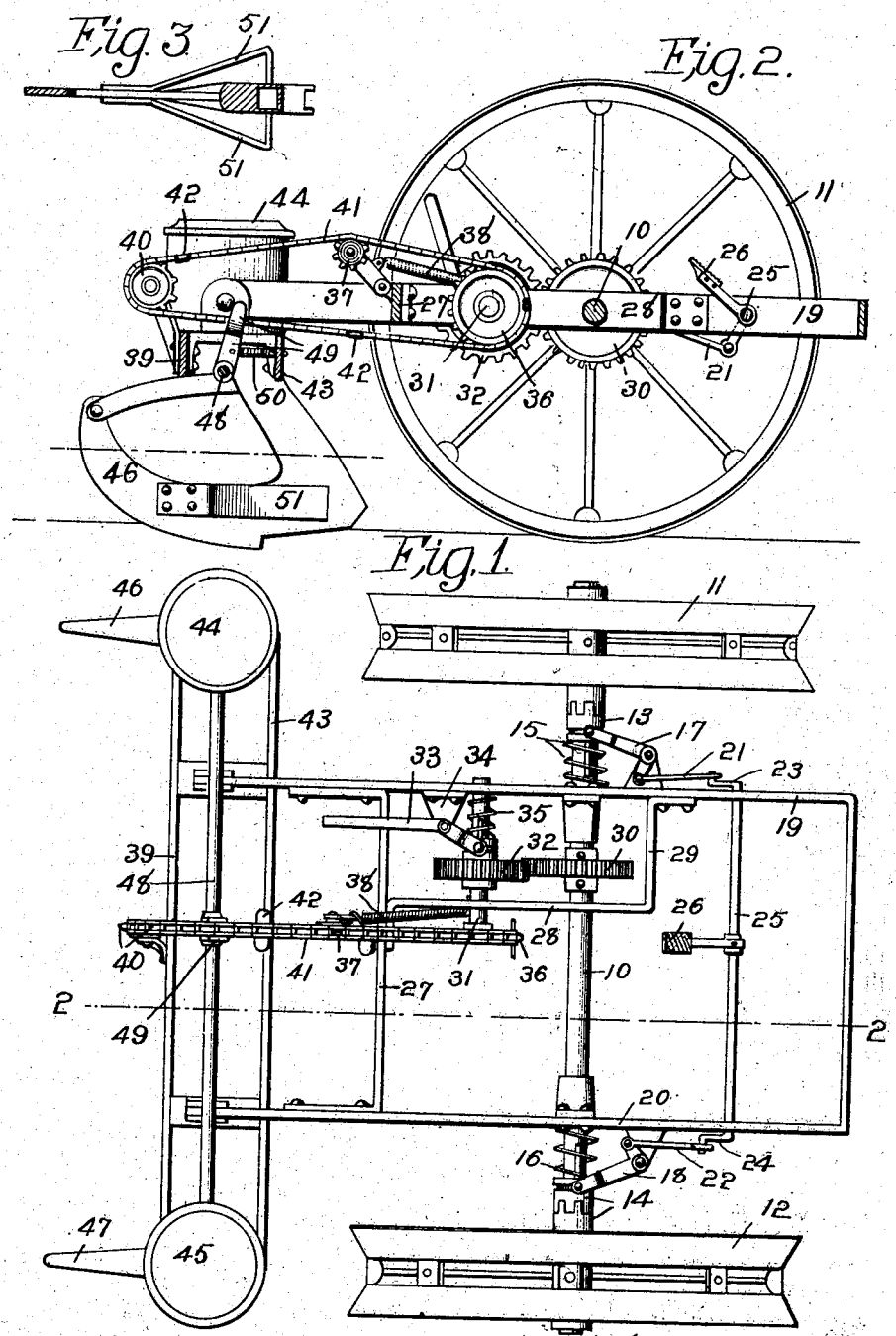
Witnesses:
A. G. Hague
S. F. Christy
Inventors, J. F. Devenney
and
N. P. Devenney
by Ourig & Lane att'ys

UNITED STATES PATENT OFFICE.

JOHN F. DEVENNEY AND NEAL P. DEVENNEY, OF BLANDEN, IOWA.

CORN-PLANTER.

No. 824,176.

Specification of Letters Patent.

Patented June 26, 1906.

Application filed September 5, 1905. Serial No. 277,132.

*To all whom it may concern:*

Be it known that we, JOHN F. DEVENNEY and NEAL P. DEVENNEY, citizens of the United States, residing at Blanden, in the county of Pocahontas and State of Iowa, have invented a certain new and useful Corn-Planter, of which the following is a specification.

The objects of our invention are to provide a corn-planter, in which there is a mechanism for rigidly securing the driving-shaft of the planter to the traction-wheels thereof, and, further, to provide means for throwing both of these wheels into or out of operation relative to the driving-shaft by a foot or other lever from the operator's seat.

A further object is to provide a mechanism for throwing the chain which operates the dropping mechanism out of and into operative relation with the driving-shaft by means of a hand or other lever, so that if the planter is not in position for dropping the first hills in the rows after a turn in line with the hills in the rows which have just been completed the operator can adjust this chain so that the dropping mechanism will operate at the proper time.

A further object is to provide a corn-planter of this class in which the wheels are so controlled that one will not travel at a more rapid rate than the other, and thus not cause the dropping mechanism to operate at irregular intervals and throw the rows of hills out of line, as occurs in the use of the ordinary corn-planter.

A further object is to provide a mechanism designed to be attached to the runners of the planter for throwing the clods of dirt out of the rows and to insure soft ground being adjacent to the hills and causing them to be covered properly as the traction-wheels pass over them.

Our invention consists in certain details in the construction, arrangement, and combination of the various parts of the device whereby the objects contemplated are attained, as hereinafter more fully set forth, pointed out in our claims, and illustrated in the accompanying drawings, in which—

Figure 1 is a plan view of the corn-planter with the seat and draft appliance removed. Fig. 2 is a sectional view cut on the line 2 2 of Fig. 1; and Fig. 3 is a detail sectional view of one of the runners, showing a plan view of our attachment for throwing the clods of earth away from the runners as the machine is advanced over the ground-surface.

Referring to the accompanying drawings, we have used the reference-numeral 10 to indicate the driving shaft or axle of the machine, on the ends of which we have rotatably mounted the ordinary traction-wheels 11 and 12. Feathered to the driving-shaft and adjacent to the traction-wheels 11 and 12 are two collars 13 and 14, which have teeth on their outer faces designed to engage teeth on the inner faces of the traction-wheels 11 and 12, respectively, so arranged that as these sliding collars 13 and 14 are thrown into engagement with the traction-wheels 11 and 12 the driving-shaft 10 is thrown into operative relation with these wheels and held stationary relative to them. We have provided the springs 15 and 16 to hold the collars 13 and 14, respectively, normally into engagement with the traction-wheels, so that the shaft and traction-wheels are normally secured together.

Secured to the collars 13 and 14 in such a way that these collars will rotate freely relative to them are the two bell-crank levers 17 and 18, respectively, which levers are pivotally attached to the sides 19 and 20 of the frame of the corn-planter, which is mounted on the driving-shaft 10. To the free ends of the bell-crank levers 17 and 18 are the links 21 and 22, respectively, to the free ends of which the cranks 23 and 24 are connected to oscillate, and said cranks are cast integral with the crank-shaft 25, which connects the sides 19 and 20 of the frame. A foot-lever 26 is provided for rocking the crank-shaft and throwing the collars 13 and 14 out of engagement with the traction-wheels 11 and 12 and the shaft 10 out of operative relation with these wheels against the resistance of the springs 15 and 16. On account of this construction it will be seen that the shaft or axle 10 can be locked into position relative to the driving-wheels 11 and 12, and the wheels can be thrown out of a locked position relative to this shaft and allowed to rotate freely on it at the pleasure of the operator.

Connecting the sides 19 and 20 of the frame and adjacent to the forward end is a cross-bar 27. Secured to the rear of this cross-bar 27 is a rearwardly-extended bar 28, having the right-angled extension 29 thereon, which is secured at its rear end to the side 19 of the frame. Mounted on the driving shaft or axle 10, between the side 19 of the frame and the bar 28, is the gear 30, said gear constituting a driving connection between the traction-wheels and the belt. Mounted in the bar 28 and the side 19 of the frame is a shaft 31, on which is mounted the gear 32 in mesh with the gear 30. Secured to the gear 32 in such a way that the gear is free to rotate is the lever 33, which is pivotally secured to a lug 34, attached to the frame 19. This lever is so arranged and connected with the gear 32 that by operating it the gear 32 may be thrown out of operative relation with the gear 30 against the resistance of a spring 35, which is mounted on the shaft 31 and is designed to normally hold the gear 32 in position on the shaft, where it is in operative relation with the gear 30.

Mounted on the inner end of the shaft 31 is a sprocket-wheel 36. Pivotally connected with the cross-bar 27 is a sprocket-idler 37, and a spring 38, which is attached to the bar 28, supports this idler in the proper position for the purposes hereinafter made clear.

At the forward end of the frame there is a bar 39, upon the forward side of which is mounted the sprocket 40. Passing around the sprocket-wheels 36, 37, and 40 is a sprocket-chain 41, having a number of operating-lugs 42 secured to it at equal distances from each other. As this chain is driven the sprocket-idler 37, which is maintained by the spring 38, constantly holds the chain 41 taut as it is being driven and takes up any slack in this chain. A cross-bar 43 is mounted adjacent to the forward end of the frame 10 and substantially parallel with the bar 39.

Mounted at the ends of the bars 39 and 43 are the two boxes or hoppers 44 and 45, in which the corn is placed for planting beneath which the runners or furrow-openers 46 and 47, respectively, are attached. A shaft 48 is provided, which extends across the forward end of the frame between the cross-bars 39 and 43, to the ends of which the dropping mechanisms in the boxes 44 and 45 (not shown) are operatively connected. Rigidly secured to the shaft 48 and midway between its ends is a forked operating-lever 49, between the tines of which the chain 41 is designed to pass as it is operated. As the chain 41 is driven the lugs 42 engage the tines of the lever 49 and move the lever forwardly against the resistance of the spring 50 (which maintains the lever 49 at its inner limit of movement) and causes the shaft 48 to be rocked and operate the dropping mechanisms in the boxes. It will be seen on account of the fact that the lugs 42 are spaced equidistant on the chain 41 the dropping mechanisms will be operated as this chain travels a certain predetermined distance, and therefore for this reason the rows will be dropped in line with each other.

On account of the fact that the driving-shaft 10 is constantly held stationary relative to the traction-wheels neither of the traction-wheels can travel faster than the other.

Attached to each side of each of the runners 46 and 47 is a guard 51, which are designed to engage the surface of the ground as the machine is advanced over the ground-surface and force clods of earth coming in the path of the runners to the side of row, and thus prepare the earth so that the wheels which pass over the hills of corn which have been dropped will be evenly covered up.

In practical operation and assuming that two rows have been planted and that the driving-shaft is secured to the traction-wheels 11 and 12 and the end of the row is reached, the operator operates the lever 26 to throw the collars 13 and 14 out of engagement with the traction-wheels 11 and 12, so that these wheels can rotate freely on the shaft 10 in making the turn, and hence throw the entire device out of operative relation with the traction-wheels. When the next two rows are reached and the operator is ready to throw the operative parts of the device into operative relation to the traction-wheels, he releases the lever 26, and the device is in readiness for full operation. However, before he commences to operate the planter on the next two rows he throws the gear 32 out of engagement with the gear 31 and by adjusting the chain 41 places the dropping mechanism in proper position, so that it will operate to drop the corn in line with the two hills in the preceding rows last planted. He then throws the gear 32 into operative relation with the gear 30 and proceeds with the planting.

Having thus described our invention, what we claim, and desire to secure by Letters Patent of the United States therefor, is—

1. In a corn-planter, the combination of a frame, a shaft or axle journaled in the frame and bearing traction-wheels, dropping mechanism, a forked lever connected with the dropping mechanism, a shaft bearing a sprocket-wheel, a second sprocket-wheel, a sprocket-belt arranged on said sprocket-wheels and having lugs for actuating the forked lever, a gear-wheel mounted on the shaft or axle, a gear-wheel feathered on the shaft bearing the sprocket-wheel, a spring normally holding the latter gear-wheel in mesh with the first-mentioned gear-wheel, and means for moving the second-mentioned gear-wheel out of mesh with the first-mentioned gear-wheel.

2. In a corn-planter, the combination of a frame, a shaft or axle journaled in the frame and bearing traction-wheels, dropping mechanism, a forked lever connected with the dropping mechanism, a shaft bearing a sprocket-wheel, a second sprocket-wheel, a sprocket-belt arranged on said sprocket-wheels and having lugs for actuating the forked lever, a gear-wheel, a gear-wheel feathered on the shaft bearing the sprocket-wheel, a spring normally holding the latter gear-wheel in mesh with the first-mentioned gear-wheel, means for moving the second-mentioned gear-wheel out of mesh with the first-mentioned gear-wheel, an arm pivotally connected to the frame and bearing a sprocket-idler arranged to engage the sprocket-belt, and a spring operating on said arm to hold the idler against the sprocket-belt.

3. In a corn-planter, the combination of a frame, a driving shaft or axle, traction-wheels thereon, sliding means on the driving shaft or axle for maintaining the traction-wheels rigidly thereto, a foot-lever for operating the said sliding means, a gear on the driving shaft or axle, an auxiliary shaft bearing a sprocket-wheel, a second sprocket-wheel, dropping mechanism, a forked lever connected with said dropping mechanism, a sprocket-belt arranged on the sprocket-wheels and having lugs for actuating the forked lever, a gear-wheel feathered on the auxiliary shaft, a spring normally holding said gear-wheel in mesh with the gear-wheel on the driving shaft or axle, and means for moving the gear-wheel on the auxiliary shaft out of mesh with the other gear-wheel.

4. In a corn-planter, the combination of a frame, traction-wheels, a dropping mechanism, a forked lever connected therewith, a belt having means at intervals for actuating the forked lever, a driving connection intermediate the traction-wheels and the belt, means for separating said driving connection from the traction-wheels, and means for separating the belt from the driving connection.

5. In a corn-planter, the combination of a frame, traction-wheels, a dropping mechanism, a forked lever connected therewith, a belt having means at intervals for actuating the forked lever, a driving connection intermediate the traction-wheels and the belt, means for separating said driving connection from the traction-wheels, means for separating the belt from the driving connection, an arm pivoted to the frame and bearing an idler-wheel arranged in engagement with the belt, and a spring operating on the arm to hold the idler-wheel against the belt.

JOHN F. DEVENNEY.
NEAL P. DEVENNEY

Witnesses:
V. P. McMANUS.
A. F. VOLBERDING.